Patented July 18, 1944

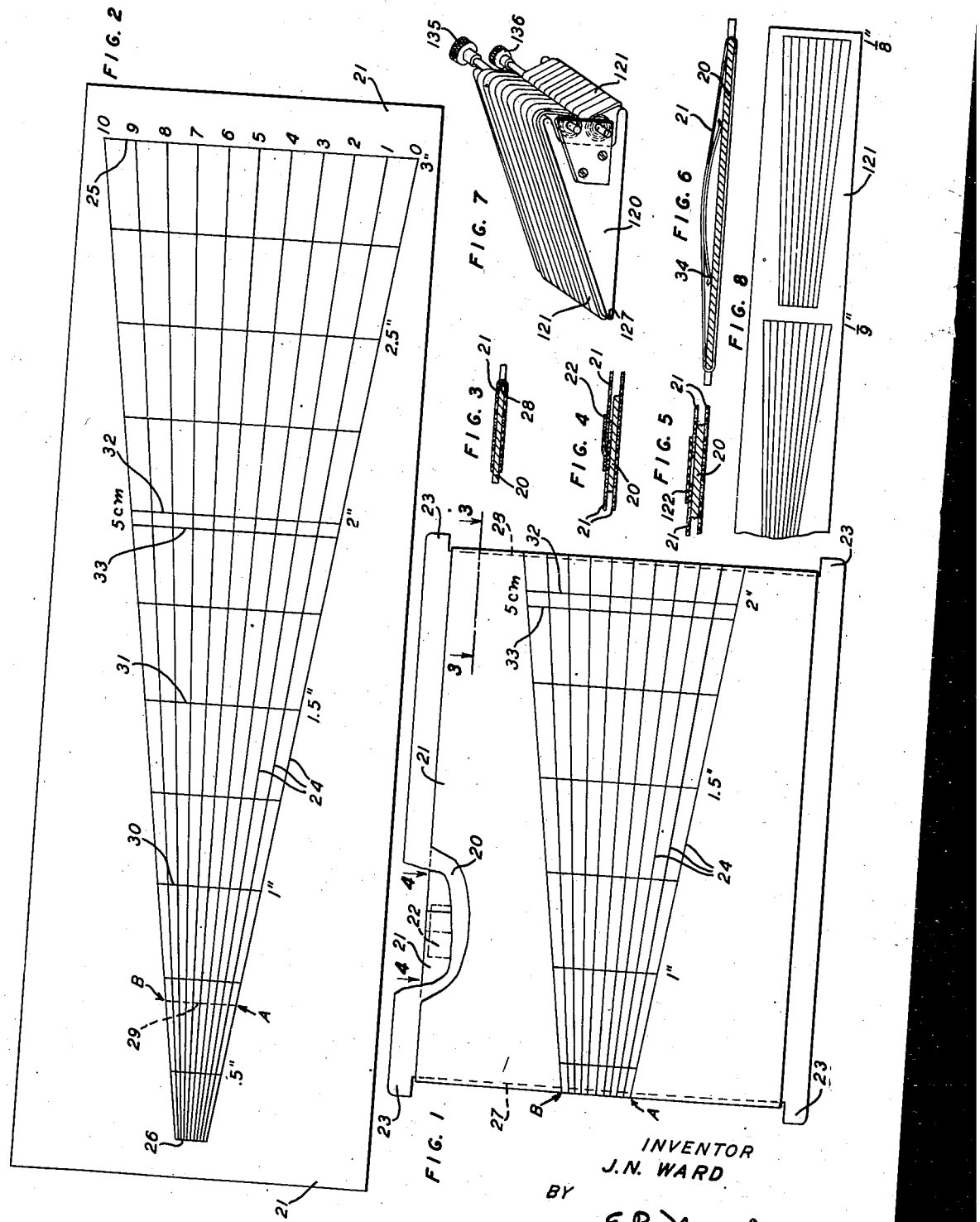

2,353,799

UNITED STATES PATENT OFFICE 2,353,799

MEASURING DEVICE

James N. Ward, West New York, N. J., assignor to Western Electric Company, Incorporated, New York, N. Y., a corporation of New York Application March 17, 1943, Serial No. 479,439

2 Claims. (Cl. 33—107)

This invention relates to a measuring device and more particularly to a device for reproducing measurements of an object, drawing, diagram, graph or the like upon a predeterminedly altered scale with continuous adjustability of the ratio of the new scale to the old within a wide range of values of the ratio.

When assembling technical or engineering data for comparison and study, it may often be desirable to reproduce diagrams, graphs and the like taken from mutually independent sources and originally having different scales of representation, in such manner that the reproductions will have a common scale and are thus directly comparable, the new scale being selected for convenience as dictated by the new purpose, and perhaps usually not being identical with the scale of any of the originals to be reproduced. In such cases it may frequently happen the ratio of enlargement or reduction necessary is not a simple fraction, i. e., a ratio of two small integers, and may even be a ratio of incommensurables. In such case the labor of converting each measurement taken of an original into the corresponding measurement to be used in the reproduction by multiplication or division by a conversion factor which may have several significant figures, is difficult, tiresome, time consuming and apt to lead to error.

An object of the present invention is to provide a handy, reliable and accurate scale changing device which is capable of continuous adjustment of its scale changing ratio through all values between two relatively widely separated extreme values.

With the above and other objects in view, the invention may be embodied in a flat, relatively thin edged, preferably rectangular body member in combination with a thin tape of flexible and inextensible sheet material carried by the body and adjustably movable longitudinally of the tape over and around a thin edge of the body, the outer surface of the tape being provided with a set of diverging graduation lines to present at the said edge of the body a graduation sequence of continuously variable scale.

Other objects and features of the invention will appear from the following detailed description of one embodiment thereof, taken in connection with the accompanying drawing in which the same reference numerals are applied to identical parts in the several figures, and in which Fig. 1 is a plan view with parts broken away of a scale changing device constructed in accordance with the invention;

Fig. 2 is a developed view of the tape of Fig. 1;

Fig. 3 is a section on the line 3—3 of Fig. 1;

Fig. 4 is a section on the line 4—4 of Fig. 1;

Fig. 5 is a view similar to Fig. 4 of a modified form;

Fig. 6 is a longitudinal section on a smaller scale of another modified form;

Fig. 7 is a view in perspective of a third form, and

Fig. 8 is a developed view of a part of the tape of Fig. 6.

Perhaps the simplest possible embodiment of the invention is shown in Figs. 1 to 4 inclusive. This consists of a flat, thin, rigid, laminar, generally rectangular base member 20, which may be of any suitable material, metal, wood, plastic, or the like. Around the member 20 is a band or tape 21 of any suitable flexible and substantially inextensible material, such as woven textile material, suitably tough and strong paper, parchment, leather, or the like, either untreated or treated with some waterproofing or body giving or other impregnating material. The tape 21 may be endless in itself or may have its ends joined to make it endless, for example by overlapping the ends and applying to this joint a transverse strip 22 of adhesive substance as best indicated in Fig. 4.

On the outer face of the tape 21 is permanently drawn, printed or otherwise marked, a set of convergingly arranged straight lines 24. These may begin for example, at a transverse line 25 extending preferably across nearly the entire width of the band or tape as near to one end of the tape as the joint 22 will conveniently permit. At the other end of the lines 24, they terminate in a relatively short transverse line 26, preferably at the center part of the tape and as near the other end of the tape as the joint 22 will conveniently permit. Thus the trapezoid formed by the outside lines 24 and the terminal lines 25 and 26 is made as large as the available surface of the tape will allow.

Preferably the base 20 and tape 21 are so dimensioned that the whole device will be easily manipulable and that the terminal line 25 may be some whole multiple of a convenient unit of length, say three inches as shown in the drawing. The terminal line 26 is made some other convenient multiple or submultiple of the same unit, e. g., one quarter inch as shown in the drawing. The lines 25 and 26 are each divided accurately into a suitable number of equal parts, e. g., ten equal parts as shown, and the lines 24 are drawn respectively from each division point of the line 25 to the corresponding division point of the line 26. The lines 25 and 26 and the edges 27 and 28 of the base 20 are all made to be parallel to each other. Any line such as 29 across the diagram and parallel to the lines 27 and 28 will be divided accurately into the same number of equal parts by the lines 24. It will be convenient to have permanent transverse lines such as 30, 31, 32, etc., so located as to have a total length respectively of some convenient multiple or submultiple of the basic unit. Thus, in the drawing, the line 30 is one inch long, the line 31 is one and a half inches, the line 32 is two inches, etc., and each is divided accurately into tenths of its whole by the eleven lines 24. Lines representing other units also may be placed on the diagram, e. g., the line 33 is five centimeters long.

By sliding the tape 21 around the base 20, the length indicated at A—B in Figs. 1 and 2 may be made to have any value whatever from and including one quarter inch, to and including three inches, in the particular device illustrated; and the segment A—B is accurately divided into tenths of its particular length no matter what that length may be. Hence, if, for example, some diagram is such that its basic unit of length equals A—B and this diagram is to be reproduced with that unit expanded to one inch, distances are measured on the original with the left hand edge of the device and with the tape in the position shown. The reading thus obtained is then laid down with a true inch scale on the reproduction using the same number of whole inches and fractions of an inch as the original gave of wholes and fractions of A—B. Thus, all the given lengths are transformed into the required accurately proportional lengths without any mental labor of calculation, and without any adjustments except the initial setting of the tape 21 on the base 20.

It may be that because of wear or because of atmospheric effects upon the tape 21, the latter may become permanenly or temporarily a little too large for the body 20 and thus become easily displaced or inaccurate in use. To obviate any such difficulty, there may be provided means to maintain a small elastic tension in the tape. Thus, as shown in Fig. 5, the two ends of the tape 21, instead of being overlapped and secured together as in Fig. 4, may be spaced slightly apart and connected by an elastic and slightly tensioned member 122, e. g., of rubber cemented to them. Or there may be inserted between the upper face of the base 20 and the portion of the tape 21 passing thereover an arched leaf 34 of resilient material, e. g., a thin arched lamina of spring brass, steel, hard rubber, or the like. If this be dimensioned and formed to be slightly flattened by the tape 21, the spring leaf will keep the tape constantly tensioned.

In the differently modified form shown in Figs. 7 and 8, the base 120 is wedge shaped, tapering away wideningly from the working edge 127. At the back of the wedge two rollers are mounted parallel to the edge 127 and rotatable by means of suitable knobs 135 and 136. The tape 121 runs over the edge 127 and has its ends wound on the two rollers. In this manner, without loss of handiness of the device or material increase in its length, a very much greater length of tape can be used. This may be of advantage where it is desired to have other than a decimal division of the basic unit. The long tape 121 can accommodate a plurality of independent trapezoidal diagrams as shown in Fig. 8, and these may have any desired subdivision of the basic unit. Thus, in Fig. 8, the left hand diagram shown gives subdivision into ninths and the other diagram gives subdivision into eighths. Preferably the rolls actuated by the knobs 135 and 136 and carrying the tape 121, should be so mounted as to present some frictional resistance to being turned, in order to serve also to keep a slight tension on the tape while in use.

Other modifications and adaptations may well be made from the illustrative embodiments disclosed and described above without departing from the spirit and scope of the invention as particularly described and pointed out in the appended claims.

What is claimed is:

1. A measuring device comprising a laminar body member having two parallel straight edges, and a tape formed into an endless loop about the body and around the two said edges transversely of the edges.

2. A measuring device comprising a laminar body member having two parallel straight edges, and a tape formed into an endless loop about the body and around the two said edges transversely of the edges in combination with means to maintain tension in the tape longitudinally thereof.

JAMES N. WARD.